(12) United States Patent
Wowsnick et al.

(10) Patent No.: US 11,781,067 B2
(45) Date of Patent: Oct. 10, 2023

(54) COMPOSITIONS AND METHODS FOR RELEASING VAPOR PHASE CORROSION INHIBITORS

(71) Applicant: EXCOR Korrosionsforschung GmbH, Dresden (DE)

(72) Inventors: Gregor Wowsnick, Dresden (DE); Bianka Leitner, Schkopau (DE); Frank Fassbender, Dresden (DE); Gerhard Hahn, Hann. Muenden (DE)

(73) Assignee: EXCOR Korrosionsforschung GmbH, Dresden (DE)

( * ) Notice: Subject to any disclaimer, the term of this patent is extended or adjusted under 35 U.S.C. 154(b) by 577 days.

(21) Appl. No.: 15/930,693

(22) Filed: May 13, 2020

(65) Prior Publication Data

US 2020/0362243 A1    Nov. 19, 2020

(30) Foreign Application Priority Data

May 13, 2019   (DE) .......................... 102019112436.0

(51) Int. Cl.
| | |
|---|---|
| *C09K 15/06* | (2006.01) |
| *C08J 3/22* | (2006.01) |
| *C08K 5/098* | (2006.01) |
| *C08K 5/1539* | (2006.01) |
| *C23F 11/02* | (2006.01) |

(52) U.S. Cl.
CPC .............. *C09K 15/06* (2013.01); *C08J 3/226* (2013.01); *C08K 5/098* (2013.01); *C08K 5/1539* (2013.01); *C23F 11/02* (2013.01)

(58) Field of Classification Search
CPC ..................................................... C23F 11/02
See application file for complete search history.

(56) References Cited

U.S. PATENT DOCUMENTS

| | | | |
|---|---|---|---|
| 2,419,327 A | 4/1947 | Wachter et al. | |
| 4,124,549 A | 11/1978 | Hashiudo et al. | |
| 4,290,912 A | 9/1981 | Boerwinkle et al. | |
| 5,316,696 A | 5/1994 | Tury | |
| 6,329,073 B1 | 12/2001 | Deruyck et al. | |
| 6,752,934 B2 | 6/2004 | Reinhard et al. | |
| 7,824,482 B2 | 11/2010 | Reinhard et al. | |
| 2007/0145334 A1 | 6/2007 | Numbu et al. | |

FOREIGN PATENT DOCUMENTS

| | | |
|---|---|---|
| DE | 2537232 A1 | 3/1976 |
| DE | 69132250 T2 | 10/2000 |
| DE | 69612858 T2 | 8/2001 |
| DE | 102007059726 B4 | 1/2010 |
| WO | 03012170 A1 | 2/2003 |

OTHER PUBLICATIONS

Bastidas et al. (2005). Volatile corrosion inhibitors: a review, Anti-corrosion Methods and Materials, 52(2), 71-77.
Kuznetsov (2018). Triazoles as a class of multifunctional corrosion inhibitors. A review. Part I. 1,2,3-Benzotriazole and its derivatives. Copper, zinc and their alloys, Int. J. Corros. Scale Inhib.,7(3), 271-307.
https://www.chemie.de/lexikon/Maleins%C3%A4ure.html (downloaded May 22, 2020).
https://www.chemeurope.com/en/encyclopedia/Maleic_acid.html (downloaded May 22, 2020).

*Primary Examiner* — Peter F Godenschwager
(74) *Attorney, Agent, or Firm* — Caesar Rivise, PC

(57) ABSTRACT

Disclosed are combinations of substances for stimulus-dependent release of vapor phase corrosion inhibitors including: (1) a matrix; (2) at least one symmetrical or asymmetrical carboxylic acid anhydride of at least one first carboxylic acid, (3) at least one salt of at least one second, highly volatile corrosion-inhibiting carboxylic acid, wherein (2) is a non-volatile anhydride or an anhydride with low volatility with a vapor pressure of preferably lower than $1 \times 10^{-3}$ Pa at 25° C. The combination is effective to release the first carboxylic acid(s) by hydrolysis of the anhydride and release the second carboxylic acid(s) of (3) from its salt by proton transfer from first carboxylic acid(s), so that the second carboxylic acid(s) is/are present as a corrosion inhibitor in the vapor phase. Also disclosed are methods for producing and using the combinations for corrosion protection of conventional industrially used metals, in, e.g., packing, storage and transport processes.

25 Claims, No Drawings

//COMPOSITIONS AND METHODS FOR RELEASING VAPOR PHASE CORROSION INHIBITORS

CROSS-REFERENCE TO RELATED APPLICATIONS

This application claims priority to DE 10 2019 112 436.0 filed May 13, 2019, the contents of which are incorporated herein by reference in their entireties for all purposes.

FIELD OF THE INVENTION

The present invention relates to combinations of substances for the release of vapor phase corrosion inhibitors (VCI) for temporary protection of conventional industrially used materials, such as iron, but also chromium, nickel, tin, zinc, aluminum, copper and alloys thereof. Polymers or polyolefin waxes into which these substances are incorporated typically serve in this case as a reservoir and carrier material.

BACKGROUND OF THE INVENTION

It has already been known for decades that solid and liquid corrosion-inhibiting substances which already have an elevated vapor pressure at room temperature and thus have a tendency towards sublimation can be used for primarily temporary protection of metal articles from corrosion in closed spaces, such as e.g. in the case of packages, during storage or transport.

The following, among others, have established themselves as very widespread substance classes [D. M. Bastidas, E. Cano, E. M. Mora, Anticorros. Method M., 52 (2005), 71-77]:
1) Primary, secondary and tertiary amines, e.g. ethanolamine, cyclohexylamine or dicyclohexylamine;
2) Inhibitors with a nitrite basis, e.g. sodium nitrite or similar salts or a combination with substances from 1 in their ammonium form, e.g. dicyclohexylammonium nitrite [U.S. Pat. No. 2,419,327A];
3) Carboxylic acids or the salts thereof; the acids in this case can bear a wide range of residues, e.g. alkyl groups, aryl groups or further functionalities such as e.g. alcohols, ketones, aldehydes, amines, etc. Typical representatives are benzoic acid and the salts thereof as well as caprylic acid and the salts thereof (caprylates) [DE102007059726B4];
4) Triazoles; a further widespread inhibitor type, in particular for the protection of copper, are triazoles, particularly benzotriazole and the substituted derivatives thereof. Various citations describe the effective protection of metals by these compounds, in particular also in combination with inhibitors of the groups described above [Yu. I. Kuznetsov, Int. J. Corros. Scale Inhib., 3 (2018) 271-307.

These substances or mixtures of substances are no longer used in their pure form as VCIs, rather are coated onto or incorporated into carrier materials. This includes, for example, the impregnation or coating of cellulose-based materials (paper, cardboard, etc.) or coating of plastics such as nonwovens, plates or foams of PE, PP, PA or polyurethane with solutions which contain VCIs.

A further possible use is the direct incorporation of the volatile inhibitors as powder into the polymer melt of plastics which are permeable for them such as polyethylene, polypropylene or polyvinyl acetate (for example, described in U.S. Pat. No. 4,290,912A, DE2537232A1). Fillers and additives such as, for example, phenols, esters or silicic acids are often described as expedient for inhibitor release and advantageous for corrosion protection (e.g. in WO2003/012170A1).

A great disadvantage of the VCI systems described and currently used is the unavoidable premature release of the VCIs contained and thus inherently the loss of some of the effectiveness in the later intended use for corrosion protection in packaging. This is a consequence of the property of the high vapor pressure of the respective VCIs which is common to all the systems and which is in principle also required for use.

An undesirable premature discharge of VCIs is promoted in particular by higher temperatures. This is, for example, the case with production of a VCI-containing compound with a polymer basis by extrusion or a VCI-containing conventional polyethylene film which is produced e.g. by the blown film method. Temperatures of more than 180° C. normally occur in the case of the latter. To this is added the storage time which cannot be avoided in practice and which also generates a possible loss of VCI.

This described disadvantage is in particular valid for volatile carboxylic acids, for example, caprylic acid, benzoic acid, among others, which already have such a significant vapor pressure at moderate temperatures that they are emitted from the VCI-containing emitter material at high speed. Depending on the concentration in the emitter, it accordingly very quickly loses its corrosion-inhibiting action as a function of time and temperature. The use of volatile salts of this compound have already been described in the literature for modification of the vapor pressure, wherein the active VCI is expediently formed from the reaction with known active inhibitors primarily on the basis of amines, for example, dicyclohexylamine, benzotriazole or monoethanolamine [U.S. Pat. No. 4,124,549; DE2537232A1].

These objects could surprisingly be achieved according to the invention by the provision of the combination of substances and the method of the invention.

DESCRIPTION OF THE INVENTION

In order to counteract the rapid time- and temperature-related degradation of highly volatile carboxylic acids described above, the combination of substances of the present invention contains as the active main component(s) at least one non-volatile carboxylic acid anhydride or carboxylic acid anhydride which only has low volatility and furthermore also at least one salt of a volatile carboxylic acid which acts in a corrosion-inhibiting manner.

The highly volatile carboxylic acid which acts via the atmospheric path is initially not present or only in traces in this mixture; on the contrary, it is only after hydrolytic cleavage of the anhydride that two equivalents of an acid (or an equivalent of a dicarboxylic acid in the case of the use of a cyclic anhydride) can be released. The anhydride and the acids which are generated by hydrolysis should have low volatility or be non-volatile since the release thereof into the gaseous phase is not desired. The released acid can rather, in the following step, transfer its proton to a salt of a volatile carboxylic acid, i.e. a carboxylate, so that a now volatile carboxylic acid is released while the salt of the acid formed from the anhydride remains in the polymer matrix. The remaining carboxylate can also, where applicable, act as a contact inhibitor as described in the literature.

The advantage of this approach lies in the fact that highly volatile components are only formed to a very small extent in the system during the production of the VCI emitters, which comprise such a combination of substances or are composed thereof, and during storage in as dry as possible conditions. As already mentioned above, the hydrolytic cleavage of the anhydride and a subsequent proton transfer must firstly precede the formation of a carboxylic acid which is active via the atmospheric path, which cleavage is above all induced by the presence of water, for example, in the case of high air humidity or upon undershooting of a dew point and which is possibly accelerated by elevated ambient temperatures. These packing materials are then able to subsequently supply the inhibitor as a function of the ambient climate. The corrosion-inhibiting action (release of the carboxylic acid) of such a VCI emitter thus primarily and advantageously only occurs where necessary, i.e. in the case of use in corrosion-promoting environmental conditions.

A combination of substances according to the invention for stimulus-dependent release of vapor phase corrosion inhibitors according to Claim 1 accordingly contains at least the following components:
(1) a matrix,
(2) at least one symmetrical or asymmetrical carboxylic acid anhydride of at least one first carboxylic acid which is not a highly volatile carboxylic acid,
(3) at least one salt of at least one second, highly volatile corrosion-inhibiting carboxylic acid with a vapor pressure of at least $1.3 \times 10^{-5}$ Pa, preferably at least $1 \times 10^{-4}$ or at least $1 \times 10^{-3}$ Pa, at 25° C., wherein the carboxylic acid anhydride of the component (2) is a non-volatile anhydride or an anhydride with relatively limited volatility with a vapor pressure of lower than $1 \times 10^{-2}$ Pa, preferably lower than $1 \times 10^{-3}$ Pa or lower than $1 \times 10^{-4}$ Pa, at 25° C., and wherein the combination of substances is able, in the case of the action of the necessary stimulus, i.e. presence of $H_2O$, to release the first carboxylic acid(s) by hydrolysis of the anhydride and release the at least one second carboxylic acid of the component (3) from its salt by proton transfer from at least one first carboxylic acid, so that at least one corrosion-inhibiting highly volatile carboxylic acid of the component (3) is present as a corrosion inhibitor in the vapor phase.

According to the invention, the matrix is preferably a polymer matrix, a PE wax or an oxidized PE wax.

The release of the volatile corrosion-inhibiting carboxylic acid from the polymer matrix of a combination of substances according to the invention is advantageously not only dependent on the time in open storage, but rather primarily on the presence of the stimulus, i.e. water, typically in the form of an elevated absolute air humidity of more than 2 g/m³, preferably more than 5 g/m³ and more preferably more than 10 g/m³, wherein the release rate is dependent on the temperature and on the concentration of water, i.e. the absolute air humidity in the atmosphere surrounding the combination of substances according to the invention, and is coupled to the following preceding reactions:

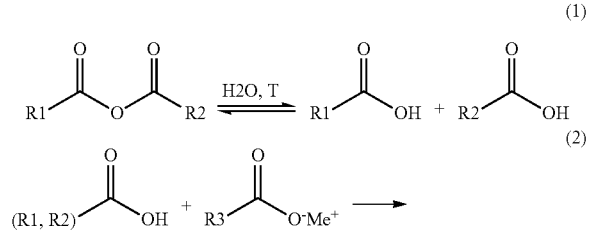

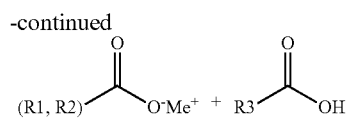

In these equations, R1, R2 and R3 denote organic residues and Me⁺ denotes a cation, e.g. an alkali, earth alkali or ammonium cation.

Reactions (1) and (2) require both a diffusion of water through the respective matrix, in particular a (typically hydrophobic) polymer matrix, such as e.g. the particularly preferred polyethylene, or a (typically hydrophobic) polyolefin wax, in order to trigger the hydrolysis of the anhydride, as well as a contact of the anhydride or the acids generated by hydrolysis with the carboxylic acid salt although these components are separated or largely separated by the solid polymer matrix. The diffusion of the water as well as the migration of the usually solid anhydride or its usually solid hydrolysis products through the solid matrix to the solid carboxylic acid salt are, among other things, temperature-dependent (increasing water vapor permeability, rising diffusion constants). This mechanism surprisingly proceeds adequately well despite the almost always solid aggregate state of components 1, 2 and 3 and it was possible to demonstrate analytically that up to 80% of the carboxylic acid salt (component 3) can be degraded. Reaction temperature T typically lies in the range from −20° C. to 80° C., more frequently in the range from 0° C. to 60° C., wherein the degradation rate of the carboxylic acid salt normally increases with the temperature in this temperature range.

The combination of substances according to the invention comprises the components (1) to (3) and the at least one first carboxylic acid of the component (2) is not a highly volatile carboxylic acid, whereby the release of a corrosion-inhibiting, highly volatile carboxylic acid is preferably or exclusively performed in accordance with the above equilibrium reaction (2).

The respective carboxylic acid anhydride of the component (2) can be formed by one carboxylic acid (symmetrical anhydride) or by two different carboxylic acids (asymmetrical anhydride). This can involve a cyclic anhydride which is formed by a molecule of a dicarboxylic acid, in particular by a dicarboxylic acid which can form a 5-, 6- or 7-membered ring, or an acyclic anhydride which is formed by two molecules of a carboxylic acid. The carboxylic acids can be saturated or unsaturated, branched or unbranched aliphatic acids, or aromatic or heteroaromatic carboxylic acids. The carboxylic acids can be unsubstituted or where applicable also bear substituent groups, preferably hydroxy or amino substituents.

The carboxylic acid anhydride can be selected in particular from the group which comprises myristic acid anhydride, naphthalic acid anhydride, in particular 1,8-naphthalic acid anhydride, 2,3-naphthalic acid anhydride and 1,4,5,8-naphthalenetetracarboxylic acid anhydride, diphenic acid anhydride, isatoic acid anhydride, pyromellitic acid anhydride, mellitic acid anhydride or asymmetrical mixed anhydrides of the stated carboxylic acids.

The carboxylic acid anhydride is preferably a non-volatile anhydride or an anhydride with relatively low volatility with a vapor pressure of lower than $1 \times 10^{-2}$ Pa, preferably lower than $1 \times 10^{-3}$ Pa, particularly preferably lower than $1 \times 10^{-4}$ Pa at 25° C.

More volatile anhydrides on one hand reduce the advantage according to the invention of releasing the active substances only in corrosion conditions into the vapor phase, and on the other hand highly volatile anhydrides are often irritating to a greater or lesser extent to eyes, skin and mucous membranes and therefore are less advisable for the production of the corrosion-inhibiting combination of substances and emitter materials at elevated temperatures or also during final use on health grounds, which is why a noticeable release or sublimation of the anhydride into the gaseous phase is expressly not desired.

In the embodiment described above, in which all the components (1)-(3) are present in the combination of substances according to the invention, acids with low volatility (or a dicarboxylic acid with low volatility in the case of use of a cyclic anhydride) are typically released from the carboxylic acid anhydride. This acid can thus, in a subsequent reaction, exchange its hydrogen ion for the cation of the salt of a volatile carboxylic acid (component (3) with corrosion-inhibiting properties. The formed volatile carboxylic acid can leave the emitter, while a salt of the carboxylic acid or dicarboxylic acid formed by hydrolysis of the anhydride remains behind.

In one preferred embodiment of the invention in the case of which the (di-)carboxylic acid formed by hydrolysis is preferably selected from the group of alkanoic acids, such as e.g. myristic acid, or the group of aromatic dicarboxylic acids, which are generated from cyclic anhydrides, such as e.g. 1,8-naphthalic dicarboxylic acid, the carboxylic acid or dicarboxylic acid or in particular the formed (di-)carboxylic acid salt is furthermore able to act as a contact inhibitor.

The formation of the contact-inhibiting carboxylic acid salt after extrusion has the further advantage according to the invention that the salt is present in a very finely distributed form in the matrix since the educts react on a molecular level in the matrix. A fine distribution of the contact inhibitor is necessary for comprehensive contact corrosion protection. This must be achieved in the case of direct addition of a contact inhibitor in salt form by previous fine milling (while preventing the reagglomeration of the particles) since individual salt crystallites can also not be comminuted during extrusion.

The salt of component (3) is in principle not particularly restricted. However, this is preferably at least one alkali, earth alkali or ammonium salt of a highly volatile corrosion-inhibiting carboxylic acid with a vapor pressure of at least $1 \times 10^{-5}$ Pa or $1.3 \times 10^{-5}$ Pa, preferably at least $1 \times 10^{-4}$ Pa, or particularly preferably at least $1 \times 10^{-3}$ Pa, at 25° C., which is selected in particular from the group which comprises saturated and unsaturated, unsubstituted alkanoic acids with 6-14 carbon atoms, saturated and unsaturated alkanoic acids with 3-6 carbon atoms which bear amino or hydroxyl substituents and aromatic or heteroaromatic carboxylic acids with 6-14 carbon atoms, in particular benzoic acid, alkyl-substituted benzoic acid derivatives, such as ortho-, meta- and para-toluic acid, amino- or hydroxy-substituted benzoic acid derivatives, furan-2-carboxylic acid or furan-3-carboxylic acid.

The (potential) active ingredient components (2) and (3) are, according to the invention, incorporated in a matrix, more specifically in a polymer matrix or polyolefin wax matrix, in order to ensure the homogeneous and finely dispersed distribution of the active ingredient components in the combination of substances according to the invention.

In the case of a polymer matrix, this can contain one or more polymers, in particular extrudable polymers.

In more specific embodiments, this/these polymer(s) is/are selected from the group which comprises polyolefin polymers, styrene polymers, polyamides, polyurethanes, polyester, polyvinyl chloride, and biodegradable polymers, such as e.g. polylactides, polybutylene adipate terephthalate, polyhydroxybutyric acid.

Such polymers, in particular polyolefin polymers, are generally preferably selected which on one hand guarantee a stable granulate form after incorporation of the VCI components and on the other hand enable good capacity for incorporation, good dispersion and homogeneity of the VCI components as a result of good compatibility or affinity of the polymer matrix of the masterbatch with the matrix material of the end product.

The term "polyolefin polymers" as used here encompasses both polyolefin homopolymers as well as copolymers of olefin monomers with monomers of other olefins or with monomers of other organic molecules which are capable of polymerization, such as e.g. vinyl acetate, styrene, acrylates and methacrylates. A wide spectrum of such polyolefin polymers are commercially available.

Specific, non-limiting examples of suitable polyolefin polymers are polyethylene, polypropylene, ethylene vinyl acetate (EVA), ethylene-butyl acrylate copolymer (EBA), ethylene-octene copolymer, ethylene-propylene copolymer.

Styrene polymers can be homopolymers or copolymers with monomers of other organic molecules which are capable of polymerization, such as e.g. vinyl acetate, olefins, acrylates and methacrylates, in particular styrene block copolymers such as, for example, styrene-butadiene copolymer, ABS, SAN, ASA.

One embodiment of the combination of substances according to the invention relates to compositions also known as masterbatches which contain the active ingredient components in a relatively high concentration and which can be mixed with one or more further polymers and can be used to produce end products with a higher ratio of polymer matrix.

Such polymers for mixing with a masterbatch are preferably selected from the group which comprises polyolefins, e.g. polyethylene or polypropylene or copolymers thereof, polystyrenes and copolymers thereof, polyamides and copolymers thereof, polyurethanes and copolymers, polyesters and copolymers thereof, polyvinyl chlorides or polylactides and polyhydroxybutyric acid.

In this case, the polymers of the masterbatch and the subsequently added polymers are preferably matched to one another in terms of mutual compatibility and in accordance with the respective end product requirements.

For example, polyolefin polymers of the masterbatch are often mixed with one or more further polyolefin polymer(s), e.g. polyethylene, polypropylene, etc.

Several non-limiting typical examples of such polyolefin polymers of the masterbatch are e.g. polyethylene (PE), ethylene copolymers such as LLDPE (typically <15 mass-% C3- to C8-olefins) or POE (typically with 15-20 mass-% C3- to C8-olefins) or ethylene copolymers with a polymerized-in vinyl acetate ratio (typically >=40 mass-%), butyl acrylate ratio (typically <=25 mass-%) or (meth)acrylic acid (ester) ratio (typically >=15 mass-%) and polypropylene (PP) or analogous propylene copolymers, e.g. ethylene-propylene block copolymers.

Other typical masterbatch formulations encompass polymers which are selected from the following groups:
  styrene block copolymers, such as, for example, styrene-butadiene copolymer for incorporation into (or mixing with) polystyrene and the copolymers thereof such as ABS, SAN, ASA;
  matrix materials which can be incorporated into (or mixed with) polyamides and the copolymers thereof, in particular thermoplastic elastomers and there especially the group of the TPE amides;

matrix materials which can be incorporated into (or mixed with) polyurethane, in particular thermoplastic elastomers and there especially the group of TPE-U;

matrix materials which can be incorporated into (or mixed with) polyester, in particular thermoplastic elastomers and there especially the group of TPE-E;

matrix materials which can be incorporated into (or mixed with) polyvinyl chlorides, in particular polyolefin polymers which have a high affinity with PVC;

biodegradable polymers, such as e.g. polylactides, polybutylene adipate terephthalate, polyhydroxybutyric acid.

In another embodiment, a polyolefin wax can be used as the matrix of component 1, which polyolefin wax then represents the matrix as a binding agent. In this case, no extrusion has to take place and the mixture can be used, for example, in a compressed form.

In principle, both non-polar and polar polyolefin waxes, in particular polyethylene waxes, are suitable as the matrix. Polar polyolefin waxes can be obtained, for example, by oxidation of non-polar polyolefin waxes, e.g. with atmospheric oxygen. These polar polyolefin waxes are generally mixtures of short-chain polymer strands which were obtained by oxidative splitting of the non-polar waxes, and typically contain e.g. carbonyl, carboxyl, hydroxy or ester groups, wherein the quantity of carboxyl groups can be determined by the acid value.

A polyethylene wax with the general structure $H(CH_2-CH_2)_xH$, wherein x is an integer which indicates the degree of polymerization (typically <700), and a mean molar mass of 3000 to 20,000 g/mol, preferably 3500-10,000 g/mol, or oxidized, polar derivatives of such a polyethylene wax is/are preferably used for the combination of substances according to the invention. In one preferred embodiment, the polyethylene wax used according to the invention has a kinematic viscosity of at least $11 \times 10^{-6}$ m$^2$/s at 100° C.

Polar polyolefin waxes, in particular polyethylene waxes, with an acid value of 0 to 20 are particularly advantageous for the combination of substances according to the invention.

The combination of substances according to the invention can, in addition to components (1) to (3), additionally contain further additives or excipients, in particular substances already introduced as corrosion inhibitors, preferably vapor phase corrosion inhibitors, individually or as a mixture of the same.

Such additional corrosion inhibitors can be, for example, triazoles (e.g. benzotriazole and substituted derivatives thereof) or highly volatile corrosion-inhibiting carboxylic acids with a vapor pressure of at least $1.3 \times 10^{-5}$ Pa, preferably at least $1 \times 10^{-3}$ Pa, at 25° C. as defined above.

An additional highly volatile corrosion-inhibiting carboxylic acid can be selected in particular from the group which comprises saturated and unsaturated, unsubstituted alkanoic acids with 6-14 carbon atoms, saturated and unsaturated alkanoic acids with 3-6 carbon atoms which bear amino or hydroxyl substituents, and aromatic or heteroaromatic carboxylic acids with 6-14 carbon atoms, in particular benzoic acid, alkyl-substituted benzoic acid derivatives, such as ortho-, meta- and para-toluic acid, amino- or hydroxy-substituted benzoic acid derivatives, furan-2-carboxylic acid or furan-3-carboxylic acid.

Further possible excipients are, for example, stabilizers, e.g. phosphites or phenols, or additives and fillers such as, for example, silicic acid or color pigments.

One specific embodiment of the combination of substances according to the invention comprises the following components:

Component (1) with a ratio in the range from 55 to 99.5 wt % or 10 to 99.5 w.-% (the latter range applies if this is a wax and the combination of substances does not have to be extruded), Component (2) with a ratio in the range from 100 to 300,000 ppm or 100 to 400,000 ppm (the later range applies if component 1 is a wax and the combination of substances does not have to be extruded), preferably 1000 to 200,000 ppm, more preferably 50,000 to 200,000 ppm and even more preferably 50,000 to 150,000 ppm, Component (3) with a ratio in the range from 2000 ppm to 300,000 ppm, or 2000 ppm to 800,000 ppm if component 1 is a wax and the combination of substances does not have to be extruded, preferably 10,000 to 300,000 ppm, more preferably 20,000 to 200,000 ppm and even more preferably 100,000 to 200,000 ppm, and where applicable further additives or excipients with a ratio in the range from 10 to 100,000 ppm, preferably 1000 ppm to 100,000 ppm, more preferably 20,000 to 100,000 ppm, in each case relative to the total quantity of the combination of substances.

This embodiment of the combination of substances contains the potential active ingredient components in relatively high ratios and can either be mixed as such, possibly after it is brought into a desired form directly as a VCI corrosion protection product, or as a "masterbatch", i.e. as a concentrated starting product, with one or more further polymer(s) and used to produce end products with a higher ratio of polymer matrix.

One specific embodiment of the combination of substances according to the invention, typically for the above-mentioned end products, comprises the following components:

Component (1) with a ratio in the range from 95 to 99.95 wt %,

Component (2) with a ratio in the range from 10 to 30,000 ppm, preferably 600 to 15,000 ppm, more preferably 1000 ppm to 8000 ppm, Component (3) with a ratio in the range from 10 ppm to 30,000 ppm, preferably 1000 to 25,000 ppm, more preferably 2000 to 8000 ppm, and where applicable further additives or excipients with a ratio in the range from 10 to 25,000 ppm, in each case relative to the total quantity of the combination of substances.

Here, component (1) also comprises those polymers which were added to the original composition of the masterbatch.

Such polymers for mixing with a masterbatch are preferably selected from the group which comprises polyolefins, e.g. polyethylene or polypropylene or the copolymers thereof, polystyrenes and the copolymers thereof, polyamides and the copolymers thereof, polyurethanes and the copolymers thereof, polyesters and the copolymers thereof, polyvinyl chlorides and polylactides and polyhydroxybutyric acid.

The combinations of substances according to the invention can be present in various forms, for example, in the form of a powder mixture, a pellet, an extruded strand, a granulate, a film, typically with a thickness in the range from 10 to 400 μm, or another shaped article or as a component in a composite material, in particular as a composite film or laminate on a carrier material.

A further aspect of the present invention encompasses methods for producing and possibly forming the combinations of substances according to the invention.

A typical method for producing a combination of substances according to the invention comprises at least the following steps:
  producing a mixture which comprises a) an extrudable polymer or an extrudable polymer mixture, b) the carboxylic acid anhydride of component (2) or the corresponding first carboxylic acid(s), c) the salt of component (3), and d) optionally further additives or excipients,
  extruding the obtained mixture at a temperature in the range of typically 90-250° C. to yield a masterbatch.

A further typical embodiment of this method further comprising at least the step of further processing of the masterbatch, possibly after mixing with a further meltable or extrudable polymer or a further meltable or extrudable polymer mixture, to yield an end product in a desired form, e.g. a wound strand, a granulate, a film or an injection-molded part.

In the case of this further processing step, the masterbatch or a mixture of the masterbatch with a further extrudable polymer can undergo, for example, blown film extrusion, as a result of which a film with a desired diameter is produced, or is further processed by means of other methods, such as profile extrusion, injection molding processes, deep drawing processes, blow molding processes, lamination, at temperatures of 50 to 250° C. and brought into a desired form.

In one specific embodiment of the method for producing a combination of substances according to the invention, the carboxylic acid anhydride of component (2) is formed in situ by a cyclisation reaction of at least one first dicarboxylic acid of component (2) during extrusion or blowing extrusion of the mixture to be extruded at a temperature between 50° C. and 300° C., in particular in the range from 80° C. to 250° C. Dicarboxylic acids which are suitable for this embodiment are e.g. 1,8-naphthaldicarboxylic acid, 2,3-naphthal dicarboxylic acid.

Another specific embodiment includes the coextrusion of an extrudable polymer e.g. by means of blown film extrusion in particular to obtain multi-layer films. Different masterbatches can be used alternately here for the layers, wherein these have in each case a fundamental composition in the context of the above description. The ratios between the anhydride (component 2) and the carboxylic acid salt (component 3) are nevertheless different and indeed preferably so that, in the case of one masterbatch, the anhydride is present in a stoichiometric excess, while, in the case of the second masterbatch, the carboxylic acid salt is present in a stoichiometric excess (since a anhydride molecule can release two carboxylic acid molecules, the stoichiometry is 1:2 in relation to the quantity of substances). If such an approach is taken, only some of the component added in each case in excess can initially be reacted off in both layers even in the presence of water in accordance with described reaction equations 1 and 2 (and indeed as a function of the quantity of non-stoichiometrically added component). Remaining anhydride or the (di-) carboxylic acid generated by hydrolysis from one layer must now first migrate through the polymer into the second layer. This diffusion is additionally temperature-dependent and, as a function of the layer thicknesses, the finally active, highly volatile carboxylic acid is released more slowly and over an even longer period of time even in the case of climatically challenging conditions, while at room temperature or slightly elevated temperature below 40° C. barely any migration takes place and thus also the volatile carboxylic acid is barely formed. It is therefore also not advisable to completely separate both components from one another in different layers since such films, in moderate climatic conditions such as e.g. 25° C., can almost only discharge the VCI which was formed during or shortly after the extrusion process as a result of the presence of traces of water or brief contact with air humidity at the layer interfaces.

The concentration of components added over all the layers of the films ultimately again lies within the range indicated above when using only one masterbatch.

In another specific embodiment, in the case of which the matrix of the component (1) comprises or represents a polyolefin wax, in particular a polyethylene wax or an oxidized polyethylene wax, a typical method for producing a mixture of substances according to the invention comprises at least the following steps:
  producing the mixture of all the components,
  mechanical compression to yield a pellet, optionally with brief heating of up to 100° C.

A further aspect of the present invention relates to a method for stimulus-dependent release of vapor phase corrosion inhibitors, comprising:
the provision of a combination of substances according to the invention which contains at least:
  (1) a polymer matrix or a polyolefin wax or oxidized polyolefin wax,
  (2) at least one symmetrical or asymmetrical carboxylic acid anhydride of at least one first carboxylic acid which is not a highly volatile carboxylic acid,
  (3) a salt of at least one second, highly volatile corrosion-inhibiting carboxylic acid with a vapor pressure of at least $1.3 \times 10^{-5}$ Pa, preferably at least $1 \times 10^{-4}$ or $1 \times 10^{-3}$ Pa at 25° C., wherein the carboxylic acid anhydride of component (2) is a non-volatile anhydride or an anhydride with relatively low volatility with a vapor pressure of less than $1 \times 10^{-2}$ Pa, preferably less than $1 \times 10^{-3}$ Pa or less than $1 \times 10^{-4}$ Pa at 25° C., and
  hydrolysis of the carboxylic acid anhydride of component (2) in the presence of the stimulus $H_2O$, as a result of which at least one first carboxylic acid is released and the at least one second carboxylic acid of component (3) is released from its salt by proton transfer from at least one first carboxylic acid,
so that at least one corrosion-inhibiting highly volatile carboxylic acid of component (3) is present as a corrosion inhibitor in the vapor phase.

The rate of hydrolysis depends both on the concentration of the stimulus $H_2O$, i.e. the absolute air humidity (typically at least 2 g/m$^3$, preferably at least 5 g/m$^3$ and more preferably at least 10 g/m$^3$) and on the temperature (typically in the range from −20° C. to +80° C., more frequently in the range from 0° C. to 60° C.).

The combinations of substances according to the invention are used above all to protect the wide range of commonplace industrially used metals, such as iron, zinc, chromium, nickel, aluminum, copper, lead, tin, magnesium, silver, and alloys and combinations thereof, including galvanized, tin-plated, chromium-plated, nickel-plated, silver-plated, copper-plated steels or other of the above-mentioned metals, in packages and during storage in closed spaces from atmospheric corrosion.

A further aspect of the invention correspondingly relates to the use of a combination of substances according to the invention for corrosion protection of commonplace industrially used metals such as iron, zinc, chromium, nickel, aluminum, copper, lead, tin, magnesium, silver, and alloys or combinations thereof, in particular within packing, storage and transport processes.

The combinations of substances according to the invention are particularly preferably used for the protection of iron, zinc, aluminum and copper and alloys and combinations thereof.

The term combinations, as used here, should include in particular mechanical combinations of metals, for example, screwed-together, soldered, or welded metal parts, as well as cladded or covered base metals, for example, galvanized, tin-plated, chromium-plated, nickel-plated, silver-plated, copper-plated steels or other of the above-mentioned metals.

The subject matter of the application is explained in greater detail by the following examples.

EXAMPLES

The process as follows was performed to produce VCI emitters as a granulate or as a film: A masterbatch was extruded from the mixtures according to the invention in a twin-screw extruder at temperatures of 110° C.-180° C. and subsequently granulated. The melt pressure was between 50 and 100 bar. The strand was cooled in the water bath and subsequently granulated via a circular knife.

In order to test concentrated emitters, 1 g granulate was sealed in a Tyvek bag. In order to produce films, 2.5% of the respective masterbatch granulate was mixed with a widely available LDPE (DOW LDPE 310E) in a blown film extruder and at temperatures between 170 and 210° C. to form a bubble-cap column. The film thickness was set to 100±5 µm.

Example 1

A masterbatch was extruded from a mixture of:

| | |
|---|---|
| 15 wt % | 1,8-naphthalic acid anhydride |
| 10 wt % | Sodium caprylate |
| 1.5 wt % | Stabilizer (Irgafos 168) |
| 0.75 wt % | Stabilizer (Irganox 1010) |
| 72.75 wt % | LDPE | and sealed in a Tyvek bag and exposed to a dynamic cyclic overseas climate in accordance with DIN EN 60068-2-30. Even after a week of ageing in these harsh conditions, the granulate still exhibited excellent corrosion protection in the subsequent test in accordance with TL 8135-0002.

A film was furthermore produced from the masterbatch in the stated conditions. A reference batch was furthermore produced and from it a reference film which had the following composition in the masterbatch with otherwise fully analogous conditions:
  10% caprylic acid
  10% Sipernat S22S
  1.5% stabilizer Irgafos 168
  0.75% stabilizer Irganox 1010
  77.75% LDPE The film with the mixture of 1,8-naphtalic acid anhydride and sodium caprylate was tested in terms of its corrosion protection in the fresh state and after open storage in room atmosphere for 3 and 14 days by means of a test in accordance with TL 8135-0002 and compared with a reference film which additionally contains 10% caprylic acid alongside LDPE, the stabilizers. Result: Both films exhibit outstanding corrosion protection in the fresh state (no points of corrosion visible), which was still present to a sufficient extent for the anhydride-containing film both after 3 days and 14 days of storage (only slight visible points of corrosion). In contrast to this, the film which is solely based on caprylic acid delivers only very poor and in no way sufficient corrosion protection after only 3 days, and this corrosion protection disappears entirely after 14 days of storage (in this case, the test body is corroded to a very significant degree and over the entire surface in accordance with a VCI-free reference).

This test was likewise performed with films which were previously exposed to very harsh ageing as a result of open storage in an air-conditioned cabinet at 55° C. and 34% relative air humidity with constant fresh air supply/recirculation. Here, it was already shown in the case of the caprylic acid-based film that it no longer had an adequate corrosion protection action after only 1 h in this climate and completely failed after 4 h and 8 h hanging out (significant superficial corrosion of the test body) while the sample which contained anhydride still offered entirely sufficient protection after up to 8 h. A still significant corrosion protection action could be proven by the TL test even after 72 h in this climate although the first local flecks of rust could be observed here and signaled a reducing, but still present protection in these harsh ageing conditions. Samples of this film were furthermore aged for 72 h at 55° C. and an absolute air humidity of 10 and 73 g/m$^3$ (corresponds at this temperature to a relative AH of 10% and 70%) and subsequently studied by means of the test in accordance with TL 8135-0020. It has been shown that the film which was aged in the moistest climate no longer exhibited any corrosion protection, while the film which was stored in the driest climate exhibited adequate corrosion protection (with only very small, local points of corrosion). This shows that the volatile active ingredient was emitted significantly more quickly in the moist, corrosive climate. These experiments clearly show that these films based on the naphthalic acid anhydride/caprylate system enable the active, normally highly volatile corrosion inhibitor to be emitted in a very slow and controlled manner.

In order to test contact protection, plates composed of structural steel were shrink-wrapped tightly in film and 10 ml H$_2$O was furthermore added and thereafter sealed tight at the upper end so that the test body was partially in close contact with the film and partially surrounded by water in the lower region or in air in the upper region. The test body was now subjected to a cyclic climate test in accordance with DIN EN 60068-2-30 and compared with a VCI-free reference. In an immersion test in water within a correspondingly selected film, the first corrosive points appeared after only 30 min. in these extremely corrosive conditions on the steel plate within a VCI-free reference. These were very greatly intensified after only 1 cycle (superficial formation of red-brown rust on the steel plate). Test bodies which were packed with the described film which contained anhydride showed no sign of corrosion even after 29 cycles.

In order to test the corrosion protection of zinc, metal test bodies composed of galvanized steel were either packed in direct contact with a film or fixed in the center of a spacer frame as a carrier. This frame was then packed complete with the film which contained VCI. The samples were subjected to a cyclic climate test described in DIN EN 60028-2-30. It was demonstrated in this case that the VCI-free reference already had clear white rust flecks after 5 cycles, while the film which contained anhydride showed no or only very insignificant traces of white rust even after 29 cycles in this harsh climate. This proves the very good protection of one of the films according to the invention also for zinc.

The described corrosion protection test in the spacer frame was likewise performed with a test body composed of aluminum. In this case too, no discoloration or other changes to the surface were visible after 29 cycles. A VCI-free reference and a reference which contains caprylic acid exhibited, in contrast to this, clearly visible white points distributed over the surface which is presumably due to a chemical or morphological modification of the oxidized aluminum layer always present on the surface.

Example 2

Masterbatches of the composition stated under Example 3 were extruded, instead of in polyethylene, in each case in alternative polymers which are suitable for the extrusion of a masterbatch: ethylene butyl acrylate copolymer, ethylene-octene copolymer, styrene-butadiene copolymer, polypropylene, ethylene-propylene block copolymer.

Masterbatches of this type were added to a PE (polyethylene) in a quantity of 2.5%. All of the films obtained in this manner exhibited good to excellent corrosion protection via the atmospheric path as could be demonstrated by means of the TL test with fresh films as well as films stored in the open for 3 days and 14 days.

Example 3

A masterbatch with the composition
15% naphthalic acid anhydride
1.5% AT168
0.75% AT1010
82.75% LDPE
was blown with a quantity of 5% in PE to form a film. In an immersion test in water within a correspondingly selected film, it was shown in the case of storage in a moist varying climate that even the mere presence of the naphthalic acid anhydride was able to protect the plate in the aqueous phase and no corrosion was observed.

This shows that anhydride dissolved in water which is able in this case to hydrolyze to form its dicarboxylic acid can act as a contact inhibitor. On the contrary, in the upper part of a VCI-free PE bag, the steel sheet was already noticeably corroded since neither the anhydride dissolved in the water nor the corresponding dicarboxylic acid clearly have a sufficiently high vapor pressure in order to provide protection here via the atmospheric path.

Example 4

15% naphthalic acid anhydride
10% potassium sorbate or 10% sodium pelargonate or 10% sodium decanoate
1.5% AT168
0.75% AT1010

Masterbatches of the above composition were added to a PE in a quantity of 2.5%. A film which contains a total of 0.25% sodium pelargonate still had good to excellent corrosion protection of steel in the test in accordance with TL 8135-0002 both in a fresh state and after ageing by open storage in the uncovered state after 3 days and 14 days.

Example 5

15% naphthalic acid anhydride
30% sodium caprylate
55% PE wax (Ceretan ME 1430, non-polar) or oxidized PE wax (CWO-308)
were mixed thoroughly with one another. 500 mg of the powder mixture was formed under a load of 10 t to yield a pellet with a 10 mm diameter. The pellets were sealed in Tyvek bags and conditioned or aged both for 1 day in room conditions (conditions as in Example 1) and 3 days in a cyclic overseas climate (DIN EN 60028-2-30). These samples were subsequently checked in accordance with TL 8135-0002 in terms of corrosion protection. It has been shown that all of the samples exhibited excellent corrosion protection irrespective of the ageing, while an active ingredient-free wax pellet exhibited no corrosion protection even in the unaged state.

Example 6

From blends with the compositions:
a) 1% 1,8-naphthalic acid anhydride
15% sodium caprylate
3% sodium benzoate
0.75% AT168
0.375% AT1010
79.875% PE
as well as
b) 9% 1,8-naphthalic acid anhydride
2% sodium caprylate
0.75% AT168
0.375% AT1010
87.875% PE
masterbatches were extruded. For producing a multi-layered film, a 3-layered PE film was extruded in a 3-layer coextruder. Said 3-layered PE film had an inner layer of 40 μm and was produced with addition of exclusively masterbatch b) with 5% concentration into this middle layer. The two outer layers were in each case 20 μm thick and in the case of these masterbatch a) was exclusively added with a concentration of 5%.

Pieces of such a film were exposed to a climatic load of 55° C. at 35% rel. air humidity for the purpose of ageing. After specific times, in each case one piece was removed, the film was extracted and the inhibitor content of the eluate was determined by means of GC-MS. This procedure enables the determination of the remaining inhibitor content in the film after ageing.

It is apparent from the following table that the film loses inhibitor constantly and comparatively slowly over at least 72 h even under harsh conditions after an expected, more significant initial drop in the sodium caprylate concentration.

TABLE 1

| Period ageing at 55° C., 35% AH [h] | Rel. inhibitor content |
| --- | --- |
| 0 | 100 |
| 2 | 80.7 |
| 4 | 78.4 |
| 8 | 71.5 |
| 24 | 68 |
| 72 | 47.5 |

The invention claimed is:
1. A combination of substances for stimulus-dependent release of vapor phase corrosion inhibitors which comprises at least:

(1) a matrix,
(2) at least one carboxylic acid anhydride of at least one first carboxylic acid, wherein the at least one carboxylic acid anhydride is symmetrical or asymmetrical,
(3) at least one salt of at least one second carboxylic acid, which is a corrosion-inhibiting carboxylic acid with a vapor pressure of at least $1.3 \times 10^{-5}$ Pa at 25° C., wherein
the combination of substances is effective to respond to a stimulus by releasing the at least one first carboxylic acid by hydrolysis of the at least one carboxylic acid anhydride and releasing the at least one second carboxylic acid from its salt by proton transfer from the at least one first carboxylic acid, so that the at least one second carboxylic acid is present as a corrosion inhibitor in the vapor phase.

2. The combination of substances according to claim 1, wherein the matrix is a polymer matrix or a polyolefin wax or oxidized polyolefin wax.

3. The combination of substances according to claim 1, wherein the at least one salt of the at least one second carboxylic acid is an alkali or earth alkali salt.

4. The combination of substances according to claim 1, wherein the at least one carboxylic acid anhydride represents or comprises a cyclic anhydride which is formed by a dicarboxylic acid which can form a 5-, 6- or 7-membered ring.

5. The combination of substances according to claim 1, wherein the at least one carboxylic acid anhydride is selected from the group consisting of myristic acid anhydride, naphthalic acid anhydride, diphenic acid anhydride, isatoic acid anhydride, pyromellitic acid anhydride, mellitic acid anhydride and asymmetrical mixed anhydrides of the stated carboxylic acids.

6. The combination of substances according to claim 1, wherein the at least one first carboxylic acid has a vapor pressure of less than $1 \times 10^{-3}$ Pa at 25° C.

7. The combination of substances according to claim 1, wherein the at least one second carboxylic acid is selected from the group consisting of saturated and unsaturated unsubstituted alkanoic acids with 6-14 carbon atoms, saturated and unsaturated alkanoic acids with 3-6 carbon atoms, which bear amino and/or hydroxyl substituents, and aromatic or heteroaromatic carboxylic acids with 6-14 carbon atoms.

8. The combination of substances according to claim 7, wherein the aromatic or heteroaromatic carboxylic acids with 6-14 carbon atoms are selected from the group consisting of benzoic acid, alkyl-substituted benzoic acid derivatives, amino- and/or hydroxy-substituted benzoic acid derivatives, furan-2-carboxylic acid and furan-3-carboxylic acid.

9. The combination of substances according to claim 1, wherein the matrix is a polymer matrix which contains one or more polymers which is/are selected from the group consisting of polyolefin polymers, styrene polymers, polyamides, polyurethanes, polyester, polyvinyl chloride, and biodegradable polymers.

10. The combination of substances according to claim 9, wherein the polyolefin polymers are selected from the group consisting of polyethylene, polypropylene, ethylene vinyl acetate (EVA), ethylene butyl acrylate copolymer (EBA), ethylene-octene copolymer, and ethylene-propylene copolymer, the styrene polymers are polystyrene or styrene-butadiene copolymers, and the biodegradable polymers are selected from the group consisting of polylactides, polybutylene adipate terephthalate and polyhydroxybutyric acid.

11. The combination of substances according to claim 1, wherein the matrix is a polyethylene wax with a mean molar mass of 3,500-10,000 g/mol or an oxidized derivative of such a polyethylene wax with an acid value of 0-20.

12. The combination of substances according to claim 1, further comprising at least additional corrosion inhibitor.

13. The combination of substances according to claim 1, for use as a masterbatch, if the matrix is a polymer matrix, or for use as a powder mixture or pellet, if the matrix is a wax, which combination of substances
contains the matrix with a ratio in a range from 55 to 99.5 wt % if this is a wax and the combination of substances does not have to be extruded,
contains the at least one carboxylic acid anhydride with a ratio in the range from 100 to 300,000 ppm, or with a ratio in the range from 100 to 400,000 ppm if the matrix is a wax and the combination of substances does not have to be extruded, contains the at least one second carboxylic acid with a ratio in the range from 2000 ppm to 300,000 ppm, or with a ratio in the range from 2000 ppm to 800,000 ppm if component (1) is a wax and the combination of substances does not have to be extruded, and optionally contains further additives or excipients with a ratio in the range from 10 to 100,000 ppm in each case relative to a total quantity of the combination of substances.

14. The combination of substances according to claim 1, which
contains the matrix with a ratio in the range from 95 to 99.95 wt %,
contains the at least one first carboxylic acid with a ratio in the range from 10 to 30,000 ppm, and
contains the at least one second carboxylic acid with a ratio in the range from 10 ppm to 30,000 ppm, and optionally further additives or excipients with a ratio in the range from 10 to 25,000 ppm,
in each case relative to a total quantity of the combination of substances.

15. The combination of substances according to claim 1, which is present in a form of a powder mixture, a pellet, an extruded strand, a granulate, a film, or another shaped article, or as a component in a composite material.

16. The combination of substances according to claim 15, which is present as a two- or multi-layered film, wherein the layers have different proportions of the at least one carboxylic acid anhydride to the at least one salt of at least one second carboxylic acid.

17. A method for producing a combination of substances according to claim 1, wherein the matrix is a polymer matrix, comprising at least the following steps:
producing a mixture which comprises at least a) an extrudable polymer or an extrudable polymer mixture, b) the at least one carboxylic acid anhydride or the at least one first carboxylic acid thereof, and c) the at least one salt of at least one second carboxylic acid, and
extruding the mixture at a temperature in a range from 90 to 250° C. to yield a masterbatch of the combination of substances.

18. The method according to claim 17, further comprising further processing of the masterbatch after mixing with a further extrudable polymer or a further extrudable polymer mixture, to yield an end product in a desired form.

19. The method according to claim 18, wherein the masterbatch or a mixture of the masterbatch with the further extrudable polymer undergoes blown film extrusion, as a result of which a film with a desired diameter is produced, or is further processed by other methods, including profile extrusion, injection molding processes, deep drawing processes, blow molding processes, lamination, at temperatures of 50 to 250° C.

20. The method according to claim 19, wherein at least two different masterbatches/polymer mixtures with different proportions of the at least one carboxylic acid anhydride and the at least one salt of at least one second carboxylic acid, are produced and extruded by coextrusion into different layers which lie on top of one another and jointly form a film.

21. The method according to claim 17, wherein the at least one carboxylic acid anhydride is formed in situ by a cyclization reaction of the at least one first carboxylic acid during extrusion or blowing extrusion of the mixture to be extruded at a temperature in a range from 80 to 250° C.

22. A method for producing a combination of substances according to claim 1, wherein the matrix is a wax, comprising at least the following steps:
producing a mixture which comprises at least a) a polyolefin wax or oxidized polyolefin wax, b) the at least one carboxylic acid anhydride or the at least one first carboxylic acid thereof, and c) the at least one salt of at least one second carboxylic acid,
pressing the mixture to yield a pellet, optionally with brief heating to a maximum of 100° C.

23. A method for stimulus-dependent release of vapor phase corrosion inhibitors, comprising:
providing a combination of substances according to claim 1, which contains at least:
(1) a polymer matrix or a polyolefin wax or oxidized polyolefin wax,
(2) at least one carboxylic acid anhydride of at least one first carboxylic acid, wherein the at least one carboxylic acid anhydride is symmetrical or asymmetrical,
(3) a salt of at least one second carboxylic acid, which is a corrosion-inhibiting carboxylic acid with a vapor pressure of at least $1\times10^{-3}$ Pa at 25° C.,
wherein the at least one carboxylic acid anhydride has a vapor pressure of less than $1\times10^{-3}$ Pa at 25° C., and
hydrolysis of the at least one carboxylic acid anhydride in a presence of $H_2O$ as a stimulus, as a result of which the at least one first carboxylic acid is released and the at least one second carboxylic acid is released from its salt by proton transfer from the at least one first carboxylic acid,
so that at least one second carboxylic acid is present as a corrosion inhibitor in the vapor phase.

24. A method for corrosion protection of conventional industrially used metals within packing, storage and transport processes, said method comprising providing a combination of substances according to claim 1.

25. The method according to claim 24, wherein the industrially used metals are selected from the group consisting of iron, zinc, chromium, nickel, aluminum, copper, lead, tin, magnesium, silver and alloys or combinations thereof.

* * * * *